United States Patent [19]

Jinnouchi

[11] Patent Number: 4,943,069
[45] Date of Patent: Jul. 24, 1990

[54] SHAFT SEAL DISPOSED ABOUT A ROTATABLE SHAFT

[75] Inventor: Takeshi Jinnouchi, Sakado, Japan

[73] Assignee: Eagle Industry Co., Ltd., Tokyo, Japan

[21] Appl. No.: 341,462

[22] Filed: Apr. 21, 1989

[30] Foreign Application Priority Data

May 10, 1988 [JP] Japan ................... 63-111623

[51] Int. Cl.⁵ .............. F16J 15/16; F16J 15/40; F16J 15/34
[52] U.S. Cl. .................. 277/27; 277/45; 277/84; 277/96.1; 277/142; 277/195
[58] Field of Search ............... 277/27, 195, 198, 193, 277/84, 94, 96.1, 174, 45, 142

[56] References Cited

U.S. PATENT DOCUMENTS 2,867,458  1/1959  Kroekel .................. 277/137
4,305,592 12/1981  Peterson ................. 277/59

Primary Examiner—Allan N. Shoap
Assistant Examiner—Scott Cummings
Attorney, Agent, or Firm—Jordan and Hamburg

[57] ABSTRACT

The present invention provides a segment type seal provided with a seal dam portion and a bearing pad portion, in which a slight difference in level is set in advance between the seal dam portion and the bearing pad portion, and the seal dam portion is brought into contact with a mating element prior to the bearing pad portion to reduce the amount of leakage in the inital stage of operation.

9 Claims, 6 Drawing Sheets

FIG. 8
PRIOR ART
FIG. 10
PRIOR ART
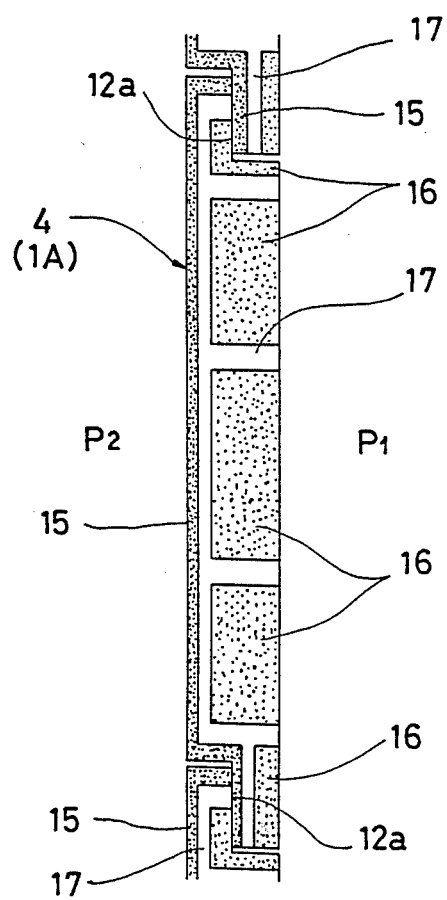
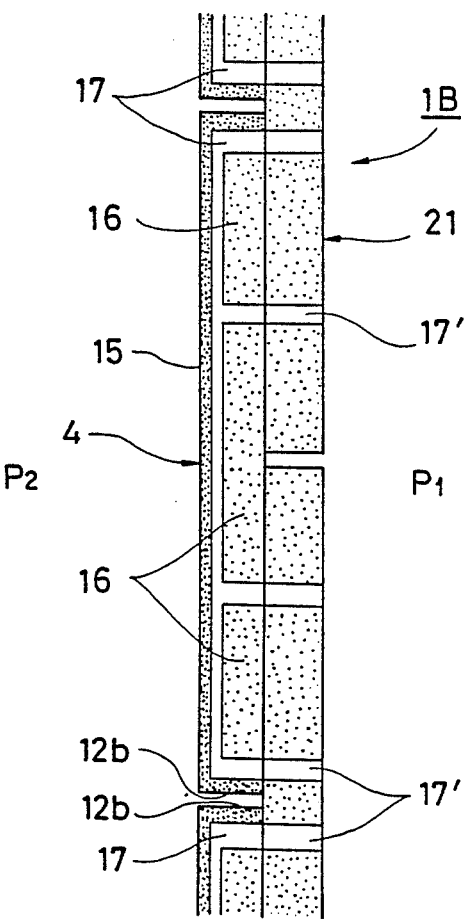

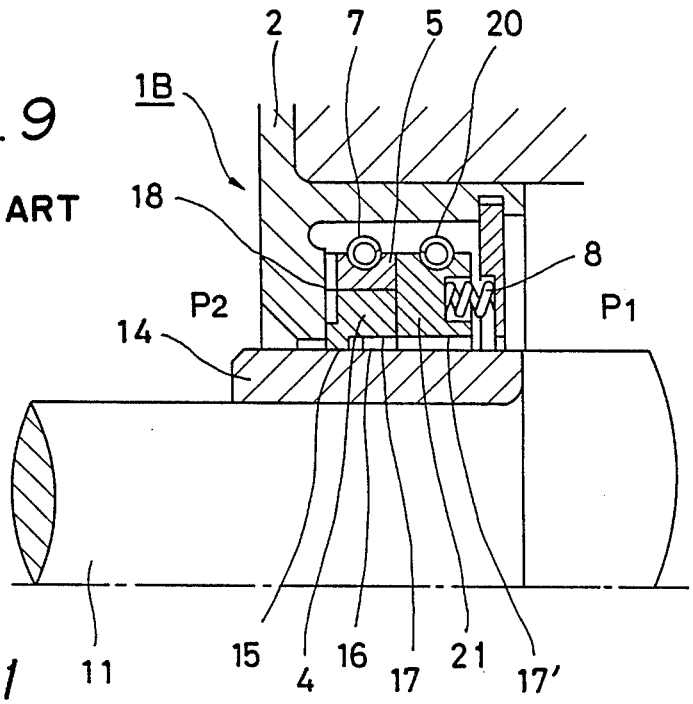
FIG.9 PRIOR ART
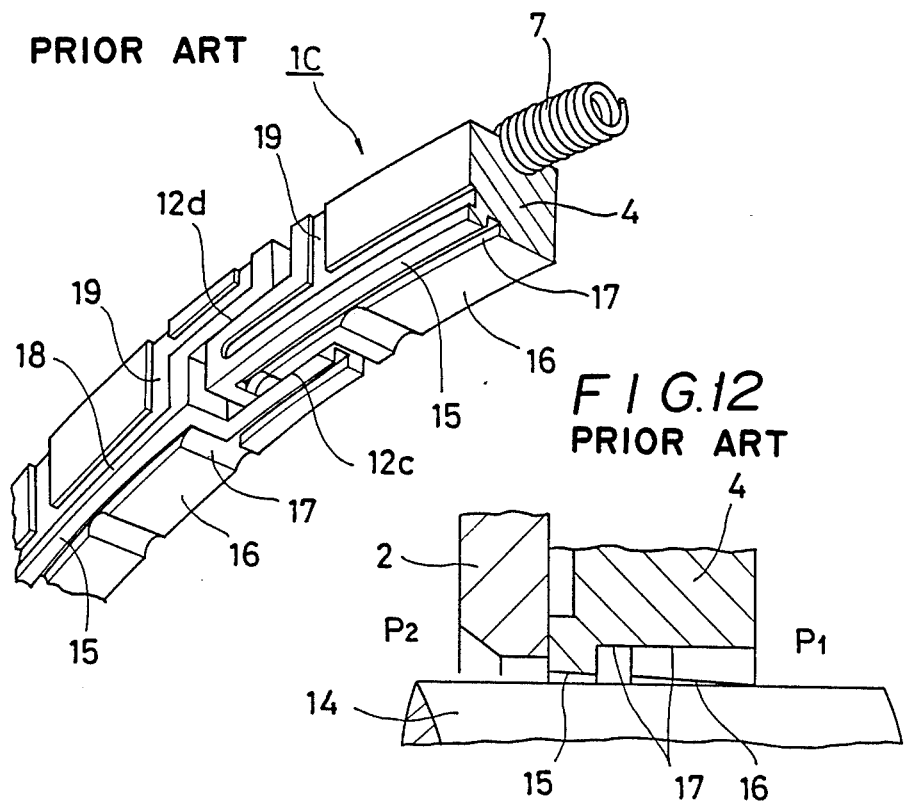
FIG.11 PRIOR ART
FIG.12 PRIOR ART

SHAFT SEAL DISPOSED ABOUT A ROTATABLE SHAFT

BACKGROUND OF THE INVENTION

The present invention relates to a cylindrical-surface seal used as one kind of a shaft seal device.

A cylindrical-surface seal has been heretofore well known which has a construction as shown in FIGS. 5 to 11.

The cylindrical-surface seal 1A shown in FIGS. 5 to 8 is called a 2-ring type which has a housing 2 encasing therein a seal ring 4, a cover ring 5, a key 6, and an element 3 in combination of an extension spring 7 and a compression spring 8, and a spring retainer 9 is placed as a lid which is fastened by a snap ring 10. The seal ring 4 and the cover ring 5 are mainly formed of carbon material, both the rings 4 and 5 being equally divided into three sections or more according to the size of a shaft 11 and combined with a divisional phase deviated in a circumferential direction. A divided portion of the seal ring 4 comprises a step joint having a lapping surface 12a which extends vertically with respect to an axial direction and in a circumferential direction in order to stop an axial leak path. The seal element 3 is stopped through the key 6 by means of a rotation lock pin 13 extending upright on the housing 2, and is fastened so as to be urged toward a shaft 11 by means of the extension spring 7 so that the seal element 3 may follow the radial movement of the rotating shaft 11 and wear of the inner diameter surface of the seal ring 4 in sliding contact with the outer diameter surface of a runner 14 disposed externally of the shaft 11.

A seal mechanism of the cylindrical-surface seal 1A of the 2-ring type described above will be explained hereinafter.

The radial leak path resulting from the division of the seal ring 4 in the circumferential direction is closed by mutual contact of the lapping surfaces 12a of the step joint as previously described. The diametral leak path in the step joint portion is closed by the contact of the cover ring 5 different in phase of the divided portion from the seal ring 4 so as to cover the step joint from the outer diameter side thereof. The inner diameter surface of the seal ring 4 in sliding contact with the outer diameter surface of the runner 14 which rotates integral with the shaft 11 is formed so as to have the same diameter with a seal dam portion 15 in sliding contact with the outer diameter surface of the runner 14 in a closed state to form a primary seal portion and a preformed bearing pad portion 16 which shares a contact surface pressure with the outer diameter surface of the runner 14 with the seal dam portion 15 to receive the pressure, the bearing pad portion 16 having a pressure balance groove 17 for introducing a fluid on the high pressure side P1 in order to relieve a radial load caused by fluid pressure to the sliding contact portion including said primary seal, the bearing pad portion 16 does not provide a primary sealing function. The seal element 3 is axially pressed by the compression spring 8 whose one end is supported by the spring retainer 9 on the high pressure side P1, and an end surface 18 opposite to the compression spring 8 is in contact with an end wall of the opposed housing 2 to form a static secondary seal. Reference numeral 19 designates a pressure balance groove for introducing a fluid on the high pressure side P1, the pressure balance groove being formed in the aforesaid end surface 18 in order to relieve the axial load caused by the fluid pressure to the contact portion between the end surface 18 including the second seal portion and the end wall of the housing 2.

Next, a cylindrical-surface seal 1B shown in FIGS. 9 and 10 is called a 3-ring type. A seal element 3 is formed in its inner diameter surface with a pressure introducing groove 17' which is divided in the same phase as that of the cover ring 5 to communicate a pressure balance groove 17 of the inner diameter surface of the seal ring 4 with a space on the high pressure side P1 and has a back ring 21 fastened by an extension spring 20 separately from the extension spring 7 adapted to fasten the seal ring 4 through the cover ring 5, the seal ring 4 and the cover ring 5 being axially pressed by the compression spring 8 through the back spring 21. The divided portion of the seal ring 4 is not formed with the step joint as in the above-described cylindrical-surface seal 1A of the 2-ring type but cut in an axially straight plane 12b. The radial leak path in the divided portion of the seal ring 4 is closed by the cover ring 5 similarly to the aforesaid 2-ring type whilst the axial leak path is closed by the back ring 21 which is different in the divisional phase from the seal ring 4 but has the same phase as that of the cover ring 5.

A cylindrical-surface seal 1C shown in FIG. 11 is called a 1-ring type. A seal ring 4 is fastened by an extension spring 7 directly without interposition of a cover ring. The divided portion of the seal ring 4 comprises a box joint which closes an axial leak path in a lapping surface 12c vertical to the axial direction and closes a radial leak path in a lapping surface 12d parallel with the outer diameter surface and inner diameter surface of the seal ring 4.

The above-described cylindrical-surface seals 1A, 1B and 1C provide a good dynamic seal by the provision of a completely closed state between the seal dam portion 15 of the inner diameter surface of the seal ring 4 and the outer diameter surface of the runner 14 on the shaft 11 side. However, actually, there sometimes occurs an insufficient contact between the seal dam portion 15 and the runner 14 due to an error in working accuracy of the inner diameter surface of the seal ring 4, resulting in an excessive amount of leak which poses a practical problem. The imperfect contact of the seal dam portion 15 occurs in the case where the inner diameter surface of the seal ring 4 is worked into a tapered shape so as to be slightly larger in diameter on the side of the seal dam portion 15 or the outer diameter surface of the runner 14 is worked into a tapered shape to be slightly smaller in diameter at a portion corresponding to the seal dam portion 15. At the time when assembled after being manufactured but not yet used, the inner diameter surface of the seal ring 4 as well as the outer diameter surface of the runner 14 on the mating side are in the state not finished by machining. Accordingly, there is unavoidably present a fine clearance between the contact surfaces of both the elements 4 and 14. The unevenness of this clearance comprises one of significant causes for the initial leak.

If the inner diameter surface of the seal ring 4 becomes run in the outer diameter surface of the runner 14 due to the wear resulting from the sliding contact, the seal dam portion 15 will be in the stabilized contact state over the whole periphery. Accordingly, the aforementioned imperfect contact state is no longer a problem. However, the seal ring 4 is originally formed of material which is resistant to wear, and in addition, the load caused by fluid pressure acting in a radial direction is relieved by formation of the pressure balance groove 17. Thus, the seal ring 4 does not readily wear. Therefore, it takes a considerable time (generally, 100 to 200 hours) till the seal dam portion 15 becomes completely run in on the runner 14 due to wear to exhibit a good sealing property, during which period a large amount of leaks unavoidably occurs.

Accordingly, in order to eliminate such an inconvenience, the working accuracy (cylindricity) of the seal ring 4 and the runner 14 should be increased to an extremely high level. However, in fact, it is difficult to perform working with high accuracy as described.

SUMMARY OF THE INVENTION

In view of the above-described problem, the present invention has been achieved for the purpose of minimizing an initial leak due to the imperfect contact between the inner diameter surface of the seal ring and the seal dam portion so as to obtain a stabilized sealing property early For achieving the aforesaid object, in a cylindrical-surface seal according to the present invention, a bearing pad portion among the inner diameter surface of the seal ring is preformed into a cylindrical surface slightly larger in diameter than that of a seal dam portion.

According to the cylindrical-surface seal of the present invention, in the inner diameter surface of the seal ring, the bearing pad portion is made larger in diameter than that of the seal dam portion, whilst in the prior art the seal dam portion has the same diameter as that of the bearing pad portion, and therefore the seal dam portion will contact the outer diameter surface of a rotary body without fail from the beginning of use. That is, the bearing pad portion is not in contact with the outer diameter surface of the rotary body, and therefore, a radial load received by the seal dam portion through a portion not supported by the bearing pad portion, namely, a load caused by a fastening force of the extension spring and a load due to the unbalance force (differential pressure) of fluid pressure acting on both outer and inner diameter surfaces of the seal ring are large, whereby the seal dam portion comes into sliding contact with the outer diameter surface of the rotary body with high surface pressure. Accordingly, even if a clearance resulting from machining is present between contact surfaces of the seal dam portion and the outer diameter surface of the rotary body, this clearance is not formed so large because the contact surface pressure is high. Moreover, the seal dam portion wears out in a very short period of time since it is not supported by the bearing pad portion, and rapidly runs in the outer diameter surface of the rotary body to provide a good close contact state. The bearing pad portion comes into contact with the outer diameter surface of the rotary body in a short period of time due to the aforesaid wear, and the radial load is shared with and received by the bearing pad portion, at which time, contact surface pressure per area is considerably reduced to suppress the progress of the wear.

As described above, in the cylindrical-surface seal of the present invention, there is provided a difference in level so that the bearing pad portion is preformed into a cylindrical surface slightly larger in diameter than that of the seal dam portion whilst in prior art, the bearing pad portion of the inner diameter surface of the seal ring and the seal dam portion have the same diameter, whereby the seal dam portion may first contact with the outer diameter surface of the rotary body without fail in the beginning of use. Thus, the initial leak amount can be extremely reduced, and since the running-in of the seal dam portion due to the wear is completed in a short period of time, it is very effective to obtain the stabilized sealing performance early with a minimal level of leak amount.

While the present invention has been briefly described, other objects and novel features of the present invention will become apparent more completely by reading the ensuing detailed description in connection with the accompanying drawings. The drawings merely show one embodiment exclusively for the purpose of explaining the present invention and are not intended to limit the technical scope of the present invention.

BRIEF DESCRIPTION OF THE DRAWINGS

FIG. 8 is a partial development view of an inner diameter surface of a seal ring;

FIG. 9 is an axial sectional view in half showing the state in which a conventional cylindrical-surface seal of a 3-ring type is mounted;

FIG. 10 is a partial development view of inner diameter surfaces of a seal ring and a back ring;

FIG. 11 is a perspective view showing a conventional cylindrical surface seal of a 1-ring type; and FIG. 12 illustrates the leak state in the initial stage of prior art.

DESCRIPTION OF THE PREFERRED EMBODIMENTS

A preferred embodiment of the present invention will be described hereinafter with reference to the drawings.

Figure 1:
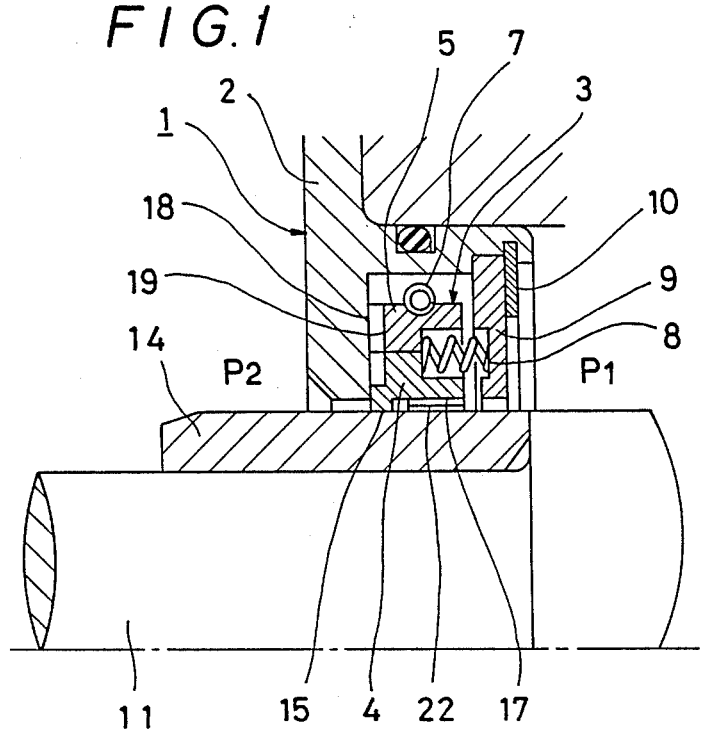
FIG. 1 is an axial sectional view in half showing the state in which a cylindrical-surface seal according to one embodiment of the present invention is mounted.
Figure 2:
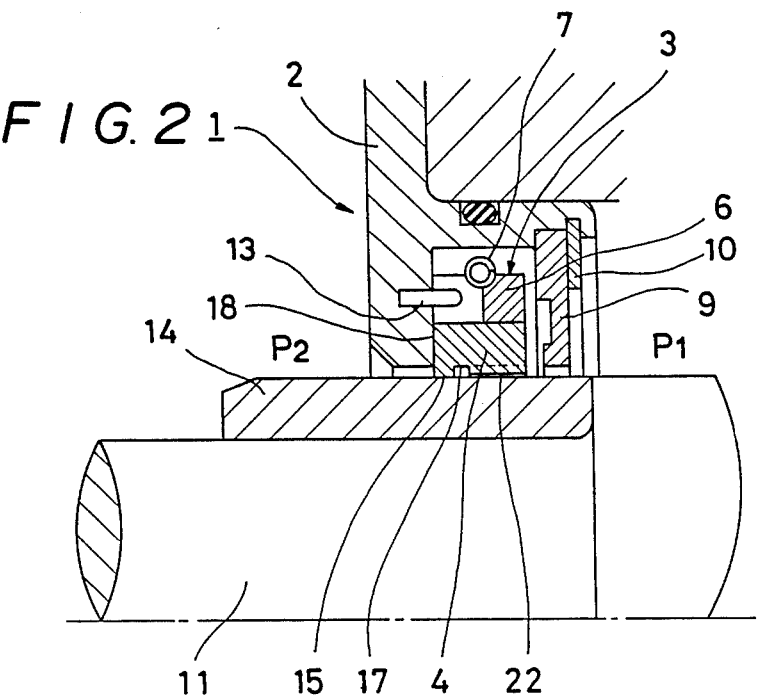
FIG. 2 is an axial sectional view in half which is different in sectional angle from FIG. 1.

A cylindrical-surface seal 1 shown in FIGS. 1 and 2 is of the 2-ring type to which the present invention is applied, in which a bearing pad portion 22 in the inner diameter surface of a seal ring 4 constituting a seal element 3 is finished so as to form a cylindrical surface slightly larger than in diameter than that of a seal dam portion 15. Parts other than those just mentioned above are similar to those of the conventional 2-ring type shown in FIGS. 5 to 8 which had been already explained.

Figure 3:
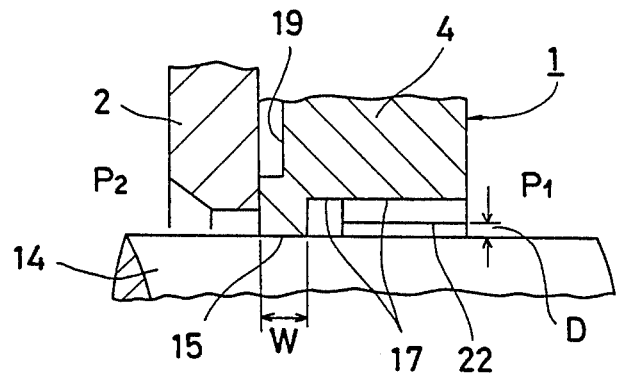
FIGS. 3 and 4 are partially enlarged sectional views of the above-described embodiment.

It has been found to be practical as a result of experiments that a difference in level D in a radial direction between the seal dam portion 15 and the bearing pad portion 22 shown in FIG. 3 on an enlarged scale is approximately 0.005 to 0.1 mm. No problem arises even if the difference in level D is set a value larger than 0.1 mm. However, it would be necessary to make the wear allowance of the seal ring 4 larger. The difference of 0.1 mm or less will suffice to achieve the desired effect.

Figure 4:
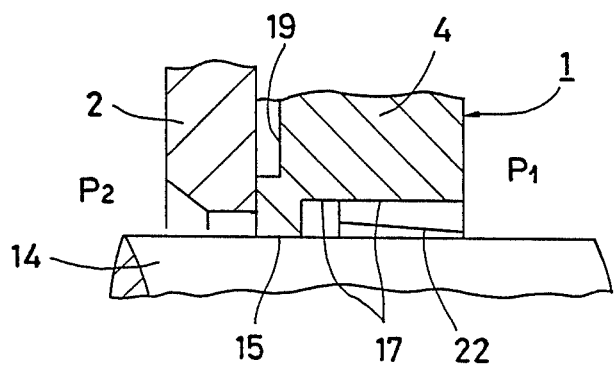
Figure 5:
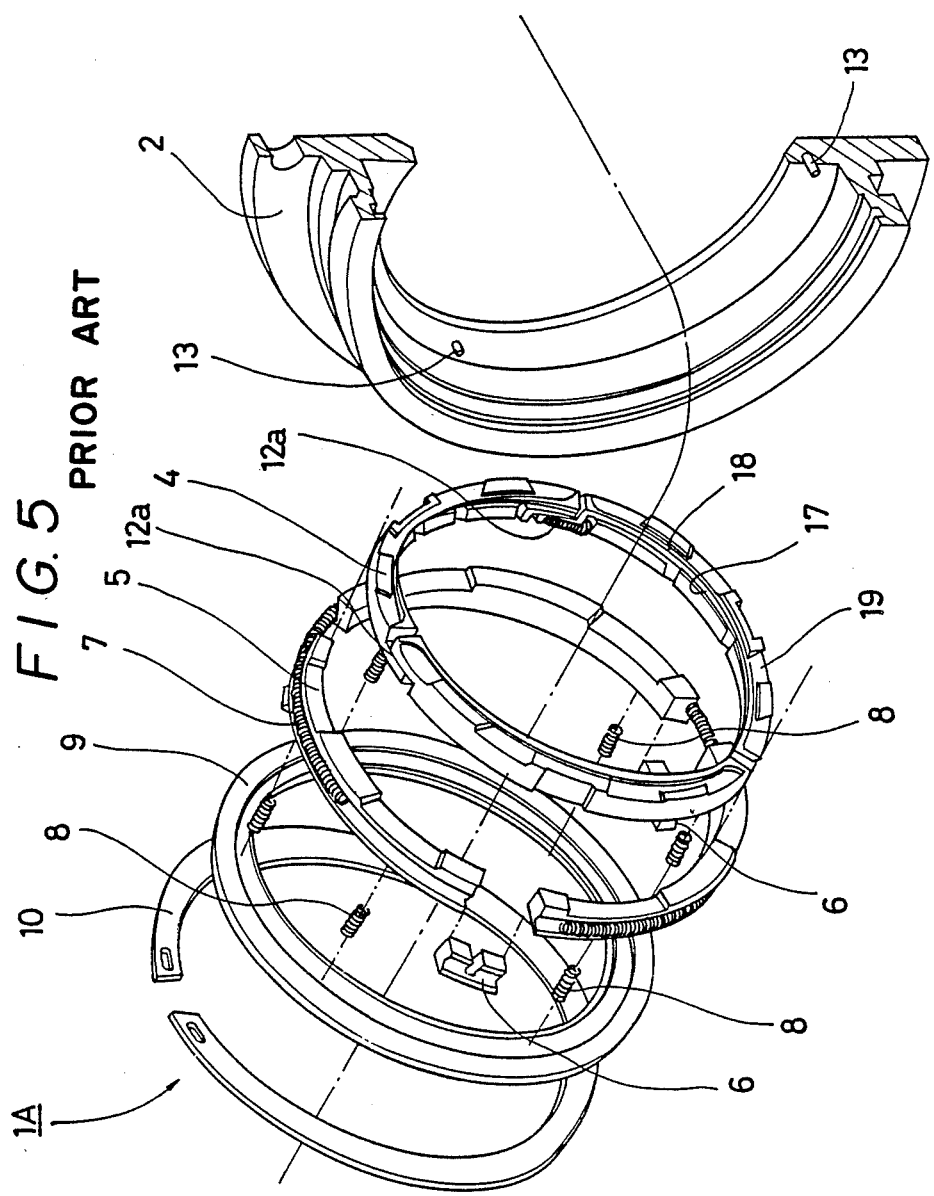
FIG. 5 is an exploded perspective view partly in section showing a conventional cylindrical-surface seal of a 2-ring type.
Figure 6:
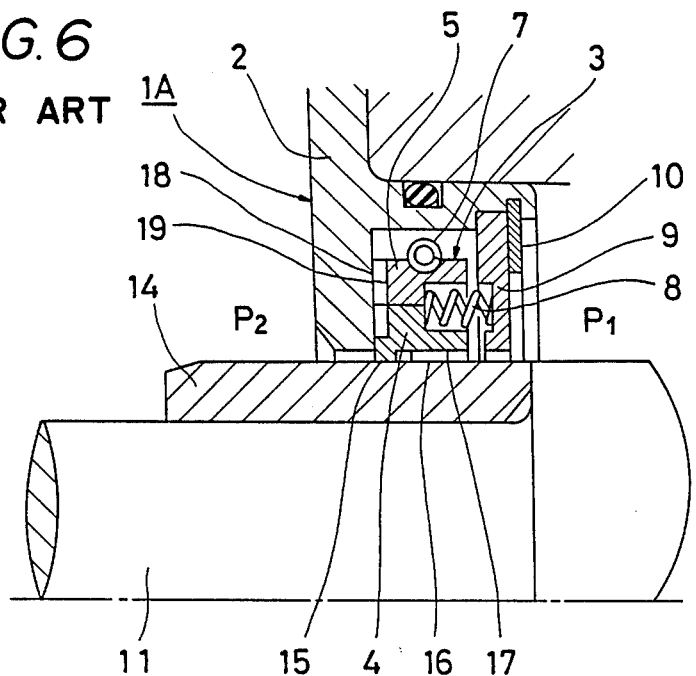
FIG. 6 is an axial sectional view in half likewise showing the mounting state.
Figure 7:
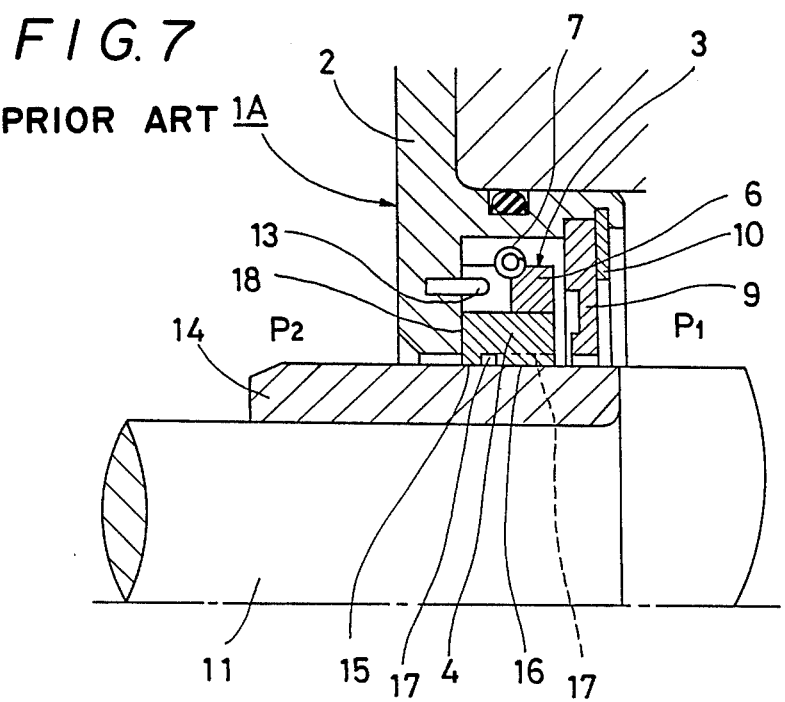
FIG. 7 is an axial sectional view in half which is different in sectional angle from FIG. 6.

According to this embodiment, as shown in FIG. 4, even if the inner diameter surface of the seal ring 4 including the seal dam portion 15 and the bearing pad portion 22 is worked into a tapered shape so as to be slightly larger in diameter toward a low pressure side P2 due to a working error, the small-diameter seal dam portion 15 will first contact a runner 14 due to the presence of the difference in level D. At that time, the fluid on the high pressure side P1 enters the bearing pad portion 22 in non-contact with the runner 14 via a pressure balance groove 17 formed in the bearing pad portion 22, the fluid being prevented from flowing toward the low pressure side P2 by the seal dam portion 15 in contact with the runner 14. The seal dam portion 15 has a seal width W set to be small in order to minimize an unbalance portion of fluid pressure on the high pressure side P1 acting in a radial direction. At the time of initial use, the bearing pad portion 22 is not in contact with the runner 14 as previously described, that is, it is not supported by the bearing pad portion 22 and therefore the seal dam portion 15 will be in sliding contact with the runner 14 with high surface pressure. Accordingly, the seal dam portion 15 rapidly wears over the entire periphery and becomes completely run in the outer diameter surface of the runner 14 in a short period of time, approximately 0.5 to 3 hours. This is an extremely great advantage when consideration the prior art which required an enormous amount of time, 100 to 200 hours till the seal dam portion 15 becomes run in. Specifically, the test operation of machineries such as large turbines, compressors and so forth on which this seal is mounted can be accomplished in an extremely short period of time, thus greatly contributing to savings and reduced expenses. As for the sealing performance, it has been assured as the result of experiments that for example, in case of a cylindrical-surface seal having a diameter $\phi$ 110, the conventional seal has an initial leak amount of 10 to 80 l/min. at a differential pressure (air pressure) of 5.6 kgf/cm$^2$ between the high pressure side P1 and the low pressure side P2 whereas the seal according to the present invention has a very small leak amount in the range of 5 to 10 l/min., obtaining the stabilized sealing property in a short period of time.

It is noted that even in the cylindrical-surface seal 1B of the 3-ring type as shown in FIGS. 9 and 10 as well as the cylindrical-surface seal 1C of the 1-ring type as shown in FIG. 1 other than the cylindrical-surface seal of the 2-ring type as described above, the bearing pad portion can be finished so as to form a cylindrical surface slightly larger in diameter than that of the seal dam portion in the inner diameter surface of the seal ring to thereby obtain the effect similar to that as described above.

While the preferred embodiments of the present invention have been described, it is obvious that numerous modifications of the present invention can be made without departing the principle thereof. Accordingly, it is desirous that all the modifications capable of substantially obtaining the effect of the present invention through the use of the structures which are the same as or correspon thereto are included in the category of the present invention.

I claim:

1. A shaft seal disposed about a rotating shaft means, comprising a non-rotating seal ring means disposed about said shaft means, resilient means disposed about said seal ring means and biasingly urging said seal ring means radially inwardly toward said shaft means, said seal ring means having a first inner cylindrical surface forming a sealing dam wear means and a second inner cylindrical surface forming a bearing pad means is attached, said seal ring means being biased by said resilient means into sliding contact with said shaft means, said bearing pad means having an initial inner diameter greater than the inner diameter of said sealing dam wear means so as to provide a clearance between said bearing pad means and said rotating shaft means, said sealing ring means having a third cylindrical surface from which said bearing pad means extends, said sealing dam wear means being constructed to rapidly wear upon sliding contact with said rotating shaft means during an initial run-in period such that after said initial run-in period, said bearing pad means comes into sliding contact with said rotating shaft means upon being urged radially inwardly by said biasing means such that both said sealing dam wear means and said bearing pad means are in sliding contact with said rotating shaft means which is the operating relationship between said seal ring means and said rotating shaft means over the life of the seal ring after said initial run-in period, said bearing pad means being constructed to last over the life of the seal ring when operating in said operational relationship.

2. A shaft seal according to claim 1, wherein said sealing dam wear means is disposed at one axial position of said seal ring means and said bearing pad means is disposed at another axial position of said seal ring means.

3. A shaft seal according to claim 1, wherein said sealing ring means has pressure balance groove means juxtaposed to said bearing pad means, said pressure balance groove means being in communication with said bearing pad means.

4. A shaft seal according to claim 3, wherein said pressure balance groove means cooperates with said bearing pad means to provide pressure balancing of the shaft seal while said bearing pad means is in contact with said shaft means.

5. A shaft seal disposed about a rotating shaft means, comprising a non-rotating seal ring means disposed about said shaft means, said seal ring means having a first operational relationship with said shaft means during an initial run-in period and a second operational relationship with said shaft means during a subsequent operation condition which extends over the life of the shaft seal, resilient means disposed about said seal ring means and biasingly urging said seal ring means radially inwardly, said seal ring means having a first inner cylindrical surface forming a sealing dam wear means constructed to rapidly wear upon sliding contact with said rotating shaft means during said initial run-in period, and a second inner cylindrical surface forming a bearing pad means, said sealing ring means having a third cylindrical surface from which said bearing pad means extends, said sealing dam wear means being in contact with said shaft means and said bearing pad means being spaced radially outwardly of said shaft means when said seal ring means is disposed in said first operational relationship with said shaft means during said initial run-in period, both said sealing dam wear means and said bearing pad means being in contact with said shaft means when said seal ring means is disposed in said second operational relationship with said shaft means, said bearing pad means being constructed to last over the life of the shaft seal when in said second operational relationship.

6. The method of initially breaking in and subsequently operating a shaft seal over its life, the shaft seal being of the type having a seal ring disposed about a rotating shaft and wherein the seal ring is biasingly urged radially inwardly toward said shaft, comprising the steps of effecting sliding contact between a first inner cylindrical portion of said seal ring and said shaft while simultaneously providing a space between a second inner cylindrical portion defining a bearing pad means of said seal ring and said shaft, rotating said shaft during an initial run-in period, effecting rapid wear of said first inner cylindrical portion of said seal ring as said first cylindrical portion slidingly contacts said rotating shaft during said initial run-in period, subsequently effecting sliding contact between said second inner cylindrical portion of said seal ring and said shaft such that both said first and second inner cylindrical portions slidingly contact said shaft, and continuing rotation of said shaft over the life of the shaft seal as both said first and second inner cylindrical surfaces slidingly contact said shaft.

7. The method according to claim 6, further comprising maintaining said space between said second inner cylindrical portion of said seal ring and said shaft during said initial run-in period.

8. The method according to claim 6, wherein said step of effecting wear of said first inner cylindrical portion of said seal ring comprises progressively wearing away said seal ring at said first inner cylindrical surface while simultaneously therewith progressively reducing said space between said second inner cylindrical portion and said shaft.

9. The method according to claim 6, further comprising the steps of effecting a seal between said first inner cylindrical portion of said seal ring and said shaft during said initial run-in period and also during said subsequent operation of said shaft over the life of said seal ring, and effecting a pressure balancing of the shaft seal utilizing a pressure balancing groove in said seal ring juxtaposed to said second inner cylindrical surface during said subsequent operation of said shaft over the life of said seal ring.

* * * * *